United States Patent
Riccio et al.

(10) Patent No.: US 11,952,491 B2
(45) Date of Patent: Apr. 9, 2024

(54) RIGID POLYURETHANE FOAM FORMULATION AND FOAM MADE THEREFROM

(71) Applicants: Dow Global Technologies LLC, Midland, MI (US); Dow Turkiye Kimya Sanayi ve Ticaret Limited Sirketi, Kocaeli (TR)

(72) Inventors: Rossella Riccio, Correggio (IT); Elena Ferrari, Vigevano (IT); Luigi Bertucelli, Reggio Emilia (IT); Esma Atlandi, Vigevano (IT); Giuseppe Vairo, Correggio (IT)

(73) Assignees: Dow Global Technologies LLC, Midland, MI (US); DOW TURKIYE KIMYA SANAYI VE TICARET LTD SIRKETI, Kocaeli (TR)

( * ) Notice: Subject to any disclaimer, the term of this patent is extended or adjusted under 35 U.S.C. 154(b) by 336 days.

(21) Appl. No.: 17/276,812

(22) PCT Filed: Sep. 30, 2019

(86) PCT No.: PCT/US2019/053844
§ 371 (c)(1),
(2) Date: Mar. 16, 2021

(87) PCT Pub. No.: WO2020/076539
PCT Pub. Date: Apr. 16, 2020

(65) Prior Publication Data
US 2021/0347989 A1     Nov. 11, 2021

(30) Foreign Application Priority Data

Oct. 9, 2018  (IT) ......................... 102018000009267

(51) Int. Cl.
*C08G 18/16*     (2006.01)
*C08G 18/18*     (2006.01)
*C08G 18/22*     (2006.01)
*C08G 18/42*     (2006.01)
*C08G 18/76*     (2006.01)
(Continued)

(52) U.S. Cl.
CPC ............ *C08L 75/06* (2013.01); *C08G 18/163* (2013.01); *C08G 18/1808* (2013.01); *C08G 18/225* (2013.01); *C08G 18/4211* (2013.01); *C08G 18/4213* (2013.01); *C08G 18/7671* (2013.01); *C08J 9/0038* (2013.01); *C08J 9/0042* (2013.01); *C08J 9/0061* (2013.01); *C08J 9/125* (2013.01); *C08J 9/127* (2013.01); *C08J 9/141* (2013.01); *C08G 2110/0025* (2021.01); *C08G 2110/005* (2021.01); *C08G 2110/0058* (2021.01); *C08J 2203/10* (2013.01); *C08J 2203/14* (2013.01); *C08J 2203/202* (2013.01); *C08J 2375/06* (2013.01); *C08J 2483/07* (2013.01); *C08J 2483/12* (2013.01); *C08L 2203/14* (2013.01)

(58) Field of Classification Search
CPC .............. C08G 18/163; C08G 18/1808; C08G 18/225; C08G 18/4202; C08G 18/4211; C08G 18/4213; C08G 18/425; C08G 18/7664; C08G 18/7671; C08G 2101/00; C08G 2110/0025; C08G 2110/005; C08G 2110/0058; C08J 9/0038; C08J 9/0042; C08J 9/0061; C08J 9/125; C08J 9/127; C08J 9/141; C08J 9/144; C08J 2203/10; C08J 2203/14; C08J 2203/142; C08J 2203/162; C08J 2203/202; C08J 2375/04; C08J 2375/06; C08J 2483/07; C08J 2483/12; C08L 75/06; C08L 2203/14
See application file for complete search history.

(56) References Cited

U.S. PATENT DOCUMENTS 2,834,748 A    5/1958  Bailey et al.
2,846,458 A    8/1958  Haluska
(Continued)

FOREIGN PATENT DOCUMENTS

DE    19631227 C1    4/1998
EP    1553129          7/2005
(Continued)

OTHER PUBLICATIONS

Kang, "Effects of Nucleating Agents on the Morphological, Mechanical and Thermal Insulating Properties of Rigid Polyurethane Foams", Macromolecular Research, 2009, p. 856-862, vol. 17, No. 11.
Kim, "Effects of Liquid-Type Silane Additives and Organoclay on the Morphology and Thermal Conductivity of Rigid Polyisocyanurate-Polyurethane Foams", Journal of Applied Polymer Science, 2012, p. 3117-3123, vol. 124.
(Continued)

*Primary Examiner* — John M Cooney

(57) ABSTRACT

A rigid polyurethane foam formulation comprising a polyol composition comprising, by weight based on the weight of the polyol composition, more than 70% of at least one polyester polyol having an average hydroxyl number of from 150 to less than 300 mg KOH/g and an average functionality of at least 2; a blowing agent comprising water and an auxiliary blowing agent; a silicone copolymer surfactant; from 1% to 5% by weight based on the weight of the polyol composition, of a cyclic siloxane having a surface tension less than 21 dynes/cm at 25° C., wherein the weight ratio of the cyclic siloxane to the silicone copolymer surfactant is from 0.6 to less than 2.27; a catalyst, and optionally a flame retardant; and a polyisocyanate; such that the isocyanate index is in the range of from 180 to 500; a rigid polyurethane foam formed from the foam formulation; and a method of forming a rigid polyurethane foam.

8 Claims, No Drawings

(51) Int. Cl.
*C08J 9/00* (2006.01)
*C08J 9/12* (2006.01)
*C08J 9/14* (2006.01)
*C08L 75/06* (2006.01)

(56) References Cited

U.S. PATENT DOCUMENTS

| | | | |
|---|---|---|---|
| 2,917,480 A | 12/1959 | Bailey et al. | |
| 2005/0154072 A1 | 7/2005 | Suck et al. | |
| 2008/0076843 A1* | 3/2008 | Clark | C08K 5/5419 521/137 |
| 2010/0298455 A1* | 11/2010 | Henning | C08G 18/225 524/588 |
| 2012/0157558 A1 | 6/2012 | Schiller et al. | |

FOREIGN PATENT DOCUMENTS

| | | |
|---|---|---|
| JP | H06287266 | 10/1994 |
| JP | H07300514 | 11/1995 |
| JP | 9165428 | 6/1997 |
| JP | 2010180369 | 8/2010 |
| JP | 2011157528 | 8/2011 |
| WO | 9748757 | 12/1997 |
| WO | 2010150955 | 12/2010 |
| WO | 2013085300 | 6/2013 |

OTHER PUBLICATIONS

Kang et al., "Liquid nucleating additives for improving thermal insulating properties and mechanical strength of polyisocyanurate foams", Journal of Materials Science, 2010, p. 5412-5419, vol. 45, No. 19.
Mondal and Khakhar, "Regulation of cell structure in water blown rigid polyurethane foam", Macromolecular Symposia, 2004, p. 241-254, vol. 216, No. 1.
PCT/US2019/053844, International Search Report and Written Opinion dated Jan. 23, 2020.
PCT/US2019/053844, International Preliminary Report on Patentability dated Apr. 8, 2021.

* cited by examiner

RIGID POLYURETHANE FOAM FORMULATION AND FOAM MADE THEREFROM

FIELD

The present invention relates to a rigid polyurethane foam formulation and a rigid polyurethane foam made therefrom.

INTRODUCTION

Polyurethane foams are widely used as thermal insulating materials in appliances such as refrigerators or as insulation for roofs and walls in the construction industry. Typically these foams are closed-cell, rigid foams containing within the cells a low-conductivity gas, such as a hydrocarbon (HC). Polyurethane insulation foams can be produced by numerous methods including high pressure spraying, low pressure frothing, pour-in-place mold techniques, and free-rise and constrained rise-board production.

Cell fineness enhancement and thereby an improvement in the insulation properties of the foam is possible by adding so-called nucleating agents that promote cell nucleation. Perfluorinated hydrocarbons are widely used nucleating agents for production of polyurethane foams. Yet commercially available perfluorocarbons (PFCs) (e.g., PF-5056 available from The 3M Company) have disadvantages with regard to their high Global Warming Potential (GWP), according to U.S. Environmental Protection Agency (EPA) report (Global Anthropogenic Non-$CO_2$ Greenhouse Gas Emissions: 1990-2020, June 2006 Revised).

Due to these environmental regulations, there is still a need for polyurethane foams with additives having GWP lower than PFCs, which exhibit improvements in thermal insulation properties of the polyurethane foams.

SUMMARY

The present invention provides a novel rigid polyurethane foam formulation comprising a specific polyol composition and a cyclic siloxane in combination with a silicone copolymer surfactant at a specific ratio. The rigid polyurethane foam formulation can provide a rigid polyurethane foam made therefrom with improved thermal insulation properties.

In a first aspect, the present invention is a rigid polyurethane foam formulation comprising:
  a polyol composition comprising, by weight based on the weight of the polyol composition, more than 70% of at least one polyester polyol having an average hydroxyl number of from 150 to less than 300 mg KOH/g and an average functionality of at least 2;
  a blowing agent comprising water and an auxiliary blowing agent;
  a silicone copolymer surfactant;
  from 1% to 5% by weight based on the weight of the polyol composition, of a cyclic siloxane having a surface tension less than 21 dyne/cm at 25° C., wherein the weight ratio of the cyclic siloxane to the silicone copolymer surfactant is from 0.6 to less than 2.27;
  a catalyst, and optionally a flame retardant; and
  a polyisocyanate;
  wherein the isocyanate index is in the range of from 180 to 500.

In a second aspect, the present invention is a rigid polyurethane foam comprising the reaction product of the foam formulation of the first aspect.

In a third aspect, the present invention is a method of forming a rigid polyurethane foam. The method comprises contacting: a polyisocyanate with the following components:
  a polyol composition comprising, by weight based on the weight of the polyol composition, more than 70% of at least one polyester polyol having an average hydroxyl number of from 150 to less than 300 mg KOH/g and an average functionality of at least 2;
  a blowing agent comprising water and an auxiliary blowing agent;
  a silicone copolymer surfactant;
  from 1% to 5% by weight based on the weight of the polyol composition, of a cyclic siloxane having a surface tension less than 21 dyne/cm at 25° C., wherein the weight ratio of the cyclic siloxane to the silicone copolymer surfactant is from 0.6 to less than 2.27;
  a catalyst, and optionally a flame retardant; and
  a polyisocyanate;
  wherein the isocyanate index is in the range of from 180 to 500.

DETAILED DESCRIPTION

"Polyurethane foam" as used herein also includes polyisocyanurate foam, urethane-modified polyisocyanurate foam, polyurethane-polyurea foam and polyisocyanurate-polyurethane-polyurea foam. Rigid polyurethane foams typically show compressive strength equal or higher than 80 kPa at room temperature (20-25° C.) measured in accordance with the European Standard UNI EN 826:2013.

The polyol composition in the foam formulation comprises one or more polyester polyols. The polyester polyols may have an average hydroxyl (OH) number in the range of from 150 to less than 300 mg KOH/g (i.e., mass of potassium hydroxide (KOH) in milligrams that is required to neutralize one gram of polyester polyol). When only one polyester polyol is used, the average hydroxyl number is the hydroxyl number of such polyester polyol. When two or more polyester polyols are used, the average hydroxyl number is the average hydroxyl number of these two or more polyester polyols, which is determined by sum of weight fraction of each polyester polyol multiplied by the hydroxyl number of each polyester polyol. The average hydroxyl number of the polyester polyols may be 150 mg KOH/g or more, 160 mg KOH/g or more, 170 mg KOH/g or more, 180 mg KOH/g or more, 190 mg KOH/g or more, 200 mg KOH/g or more, 210 mg KOH/g or more, 220 mg KOH/g or more, 230 mg KOH/g or more, 240 mg KOH/g or more, or even 250 mg KOH/g or more, and at the same time, 295 mg KOH/g or less, 290 mg KOH/g or less, 285 mg KOH/g or less, 280 mg KOH/g or less, or even 275 KOH/g or less, as measured according to ASTM D4274-16 (Test Method D). Generally the polyester polyols useful in the present invention may have an average functionality (average number of isocyanate-reactive groups/molecule) of 1.8 or more, 2.0 or more, 2.5 or more, or even 3.0 or more, and at the same time, 4.5 or less, 4.0 or less, or even 3.5 or less. Preferred polyester polyols are aromatic polyester polyols. As used herein, "aromatic" refers to organic compounds having at least one conjugated ring of alternate single and double bonds.

The polyester polyols useful in the present invention can be reaction products of polycarboxylic acids or their anhydrides with polyhydric alcohols. The polycarboxylic acids or anhydrides may be aliphatic, cycloaliphatic, aromatic and/or heterocyclic. Suitable polycarboxylic acids may include, for example, oxalic acid, malonic acid, succinic acid, glutaric acid, adipic acid, pimelic acid, suberic acid, azelaic acid, sebacic acid, maleic acid, fumaric acid, glutaconic acid, α-hydromuconic acid, β-hydromuconic acid, α-butyl-α-ethyl-glutaric acid, α,β-diethylsuccinic acid, oleic acid, linoleic acid, linoleic acid, dimerized fatty acids, phtalic acid, isophthalic acid, terephthalic acid, hemimellitic acid, and 1,4-cyclohexane-dicarboxylic acid. Preferably, the polycarboxylic acid is phthalic acid, terephthalic acid, or a mixture thereof. Suitable polyhydric alcohols that can be aliphatic or aromatic may include, for example, ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,8-octane diol, neopentyl glycol, cyclohexane dimethanol, 1,7-heptane diol, glycerol, 1,1,1,-trimethylolpropane, 1,1,1-trimethylethane, hexane-1,2,6-triol, α-methyl glucoside, pentaerythritol, quinitol, mannitol, sorbitol, sucrose, methyl glycoside, diethylene glycol, triethylene glycol, tetraethylene glycol, polyethylene glycols, dipropylene glycol, dibutylene glycol or blends thereof. Also included are compounds derived from phenols such as 2,2-(4,4'-hydroxyphenyl)propane, commonly known as bisphenol A, bis(4,4'-hydroxyphenyl)sulfide, and bis-(4,4'-hydroxyphenyl)sulfone. In some embodiments, the polyester polyol may generally be prepared from the polycarboxylic acid comprising at least 30% by weight of phthalic acid residues, or residues of isomers thereof. In some further embodiments, the polycarboxylic acid is a mixture of terephthalic acid, oleic (or other fatty) acid and phthalic anhydride. In some other embodiments, the polycarboxylic acid is a mixture of terephtalic acid and phthalic anhydride. The polyester polyols may be present in an amount of more than 70% (>70%), by weight based on the weight of the polyol composition, for example, 75% or more, 80% or more, 85% or more, 90% or more, 92% or more, 93% or more, 95% or more, 98% or more, or even 100%.

The polyol composition useful in the present invention preferably comprises a mixture of two or more polyester polyols with different hydroxyl numbers, more preferably, at least one polyester polyol having a hydroxyl number less than 300 mg KOH/g and at least one polyester polyol having a hydroxyl number of 300 mg KOH/g or higher. The polyol composition may comprise, by weight based on the total weight of the polyol composition, from 30% to 70% of a first polyester polyol having a hydroxyl number of from 200 to 250 mg KOH/g, and from 70% to 30% of a second polyester polyol having a hydroxyl number of from 280 to 320 mg KOH/g.

The polyol composition in the foam formulation may optionally comprise one or more polyether polyols. The polyether polyols may have a functionality of at least 2, from 3 to 8 or from 4 to 6, active hydrogen atoms per molecule. The polyether polyols may have a hydroxyl number in the range of from 100 to 500 mg KOH/g or from 55 to 600 mg KOH/g. The polyether polyol can be aromatic or aliphatic. The polyether polyol can be produced by any known method. Typically, the polyether polyol is formed by reaction of an initiator with one or more alkylene oxides such as ethylene oxide, propylene oxide, butylene oxide or a combination thereof, either concurrently or sequentially, thereby forming a random and/or block copolymer. Suitable initiators may include, for example, water, polyhydric alcohols; linear and cyclic amine compounds or combinations thereof. Advantageously, the aromatic-initiated polyether polyol is an alkylene oxide adduct of phenol/formaldehyde/alkanolamine resin (frequently called a "Mannich" polyol) including such as an alkoxylated derivative of nonyl phenol, formaldehyde and diethanolamine. In addition, other alkoxylates of initiators such as glycerine, sucrose, ethylene diamine and their mixtures are commonly used. The polyether polyol is typically present in an amount of from zero to 30%, for example, or from 5% to 20%, or from 10% to 20%, by weight based on the total weight of the polyol in the foam formulation.

The foam formulation of the present invention also comprises one or more polyisocyanates, which are reactive with the polyols. The polyisocyanates refer to any compound having an average of two or more, preferably an average of 2.0-4.0, isocyanate groups/molecule. The polyisocyanate may have an isocyanate groups (NCO) content from 15% to 36%, from 25% to 35%, or from 30% to 34% by weight. The polyisocyanates including organic polyisocyanates, modified polyisocyanates, isocyanate-based prepolymers, or mixtures thereof may be employed. These may be aliphatic, cycloaliphatic or in particular aromatic. Suitable polyisocyanates may include, for example, 1,6-hexamethylene diisocyanate, 1,4-tetramethylene diisocyanate, isophorone diisocyanate, cyclohexane 1,4-diisocyanate, 4,4'-dicyclohexylmethane diisocyanate, 1,3-bis(isocyanatomethyl)cyclohexane, 1,4-bis(isocyanatomethyl)cyclohexane, hexahydrotolylene diisocyanate (all isomers), 4,4'-, 2,4' and 2,2'-isomers of diphenylmethane diisocyanate (MDI) and their isomeric mixtures, 2,4- and 2,6-toluene diisocyanate (TDI) and their isomeric mixtures, naphthylene-1,5-diisocyanate, 1-methoxyphenyl-2,4-diisocyanate, 3,3'-dimethoxy-4,4'-biphenyl diisocyanate, 3,3'-dimethyldiphenylmethane-4,4'-diisocyanate, m- and p-phenylenediisocyanate, chlorophenylene-2,4-diisocyanate, diphenylene-4,4'-diisocyanate, 4,4'-diisocyanate-3,3'-dimehtyldiphenyl, 3-methyldiphenyl-methane-4,4'-diisocyanate, diphenyletherdiisocyanate, 2,4,6-triisocyanatotoluene, 2,4,4'-triisocyanatodiphenylether, tris-(4-isocyanatophenyl)methane, toluene-2,4,6-triyl triisocyanate, 4,4'-dimethyldiphenylmethane-2,2',5',5'-tetra(isocyanate), m-phenylene diisocyanate, diphenylmethane-4,4'-biphenylene diisocyanate, 3,3'-dimethyl-4,4'-biphenyl diisocyanate, 1,3-bis-(isocyanatomethyl)benzene, 4-methoxy-1,3-phenylene diisocyanate, 4-ethoxy-1,3-phenylene diisocyanate, 2,4'-diisocyanatodiphenyl ether, 5,6-dimethyl-1,3-phenylene diisocyanate, 2,4-dimethyl-1,3-phenylene diisocyanate, 4,4-diisocyanatodiphenyl ether, benzidine diisocyanate, 4,6-dimethyl-1,3-phenylene diisocyanate, 9,10-anthracene diisocyanate, 4,4'-diisocyanatodibenzyl, 3,3'-dimethyl-4,4'-diisocyanatodiphenylmethane, 2,6'-dimethyl-4,4'-diisocyanatodiphenyl, polymethylene polyphenyl isocyanate (commonly known as polymeric MDI, PMDI), and mixtures thereof; and prepolymers thereof. Preferred polyisocyanate is the polymeric MDI, which is a mixture of polymethylene polyphenylene polyisocyanates in monomeric MDI. Polymeric MDI products may have a free MDI content of from 5 to 50% by weight, more preferably 10% to 40% by weight. Such polymeric MDI products are available from The Dow Chemical Company under the trademarks of PAPI™ and VORANATE™. In one embodiment, the polyisocyanate is a polymeric MDI product having an average isocyanate functionality of from 2.3 to 3.3 isocyanate groups/molecule and an isocyanate equivalent weight of from 130 to 170. Suitable commercially available products may include PAPI™ 27, PAPI™ 20, PAPI™ 94, PAPI™ 95, PAPI™ 580N, VORANATE™ M229, VORANATE™ 220, VORANATE™ M595 and VORANATE™ M600, all available from The Dow Chemical Company.

The polyisocyanate in the foam formulation may be present in an amount to provide an isocyanate index of 180 or more, 190 or more, 200 or more, 210 or more, 220 or more, 230 or more, 240 or more, or even 250 or more, and at the same time, 500 or less, 490 or less, 480 or less, 470 or less, 460 or less, 450 or less, 440 or less, 430 or less, 420 or less, or even 410 or less. Isocyanate index is calculated as the number of isocyanate-groups divided by the number of isocyanate-reactive hydrogen atoms in a formulation (including those contained by isocyanate-reactive blowing agents such as water) and multiplying by 100.

The foam formulation of the present invention comprises one or more cyclic siloxanes. The cyclic siloxanes useful in the present invention may have a surface tension at 25° C. less than 21 dynes per centimeter (dynes/cm) (21 millinewtons per meter), for example, 20.5 dynes/cm or less, 20 dynes/cm or less, 19.5 dynes/cm or less, 19 dynes/cm or less, 18.5 dynes/cm or less, or even 18 dynes/cm or less. The surface tension may be measured using the "ring method" with a force tensiometer. Three replicates may be measured. For example, the surface tension of each sample under investigation can be measured using a Sigma 701 (Attension) force tensiometer with the help of an optimally wettable probe suspended from a precision balance. A height-adjustable sample carrier is used to bring the liquid to be measured into contact with the probe. For these experiments the ring method, also known as the du Noüy ring method is used. A platinum-iridium ring of standard geometry is hung from the force balance. The liquid is raised until contact with the surface is registered by the balance due to a meniscus being formed between the liquid and the ring. The sample is then lowered again so that the liquid film produced beneath the ring is stretched. As the film is stretched, a maximum force is experienced and is recorded in the measurement. For these measurements, a cycle of 10 measurements is made. Because the ring probe has a known length, the maximum force can be used to calculate the surface tension of the liquid using the following equation:

$$\gamma = \frac{F_{max} - F_V}{L \cdot \cos\theta}$$

Where, $\gamma$=surface or interfacial tension; Fmax=maximum force; $F_V$=weight of volume of liquid lifted; L=wetted length, and $\theta$=contact angle. The weight of the volume of liquid lifted beneath the ring, expressed by the term $F_V$, must be subtracted from the measured maximum force to get the true force exerted by the liquid. Because the ring is made of platinum-iridium to have as large a surface energy as possible, at the point of maximum force the contact angle $\theta$ is effectively 0°. This means that at the point of maximum force, the term cos $\theta$ has the value 1.

The cyclic siloxanes useful in the present invention may have the structure of formula (I),

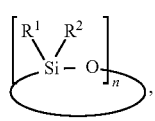

where n is from 3 to 6, $R^1$ and $R^2$ are each independently —H, —$CH_3$, —$CH_2$—$CH_3$, —CH=$CH_2$, —$CH_2$—$CH_2$—$CF_3$, preferably, $R^1$ and $R^2$ are each independently —$CH_3$.

Examples of suitable cyclic siloxanes include hexamethylcyclotrisiloxane, octamethylcyclotetrasiloxane, decamethylcyclopentasiloxane, dodecamethylcyclohexasiloxane, or mixtures thereof. The cyclic siloxane in the foam formulation may be present in an amount of 1% or more, 1.2% or more, 1.5% or more, 1.8% or more, 2% or more, 2.1% or more, 2.2% or more, 2.3% or more, 2.4% or more, or even 2.5% or more, and at the same time, 5% or less, 4.8% or less, 4.6% or less, 4.5% or less, 4.4% or less, 4.3% or less, 4.2% or less, 4.1% or less, 4.0% or less, 3.8% or less, 3.5% or less, 3.2% or less, or even 3.0% or less, by weight based on the weight of the polyol composition.

The foam formulation of the present invention further comprises one or more silicone copolymer surfactants. Such surfactants are employed to stabilize the foaming reaction against collapse and the formation of large uneven cells. The silicone copolymer surfactants useful in the present invention may comprise one or more polyether-polysiloxane copolymers. As used herein, "polyether" designates a polyoxyalkylene group. The polyoxyalkylene group typically can comprise oxyethylene units (—$C_2H_4O$—), oxypropylene units (—$C_3H_6O$—), oxybutylene units (—$C_4H_8O$—), or combinations thereof. The polyether-polysiloxane copolymers can be polysiloxane polyoxylalkylene block copolymers. The polyether-polysiloxane copolymers may have a molecular weight of 200 or more, 300 or more, 400 or more, 500 or more, 800 or more, 1,000 or more, 1,200 or more, or even 1,500 or more, at the same time, 80,000 or less, 70,000 or less, 60,000 or less, 50,000 or less, 40,000 or less, 30,000 or less, 25,000 or less, or even 20,000 or less. The polyether-polysiloxane copolymers useful in the present invention may comprise polyether chains with a molecular weight of from 102 to 4,500, from 200 to 3,000, or from 300 to 2,000. The polyether chains of the polyether-polysiloxane copolymers may comprise, by weight based on the weight of the polyether chains, from 40% to 100%, from 60% to 100%, or from 80% to 100% of oxyethylene units. "Molecular weight" herein refers to a number average molecular weight determined by routine analytical techniques, such as Gel Permeation Chromatography (GPC). Typical equipment can consist of a Waters 2695 Separations Module and a Waters 2410 differential refractometer. The separation can be made with two (300 mm×7.5 mm) Polymer Laboratories PLgel 5 µm Mixed-C columns. The samples can be prepared in Tetrahydrofuran solvent and the analysis can be performed using Tetrahydrofuran as eluent. Molecular weight averages can be determined relative to a calibration curve created using polystyrene standards.

Examples of suitable polyether-polysiloxane copolymers include those disclosed in U.S. Pat. Nos. 2,834,748; 2,917,480 and 2,846,458. Some examples of commercially available products include VORASURF™ DC 193 and VORASURF™ SF 2938 silicone surfactants both from The Dow Chemical Company (VORASURF is a trademark of The Dow Chemical Company), TEGOSTAB B 8421 polyether-polydimethyl-siloxane copolymer from Evonik, Niax L 6635 and Niax L 6633 silicone copolymers both from Momentive Performance Materials, or mixtures thereof.

The silicone copolymer surfactant useful in the present invention may be present in an amount of 0.1% or more, 0.2% or more, 0.3% or more, 0.4% or more, 0.5% or more, 0.55% or more, 0.6% or more, 0.65% or more, or even 0.7% or more, and at the same time, 2% or less, 1.9% or less, 1.8% or less, 1.7% or less, 1.6% or less, 1.5% or less, 1.4% or less, 1.3% or less, 1.2% or less, 1.1% or less, or even 1.0% or less, by weight based on the total weight of the foam formulation. Preferably, the silicone copolymer surfactant is present in an amount to provide the weight ratio of the cyclic siloxane to the silicone copolymer surfactant greater than 0.6 to less than 2.27, for example, 0.65 or more, 0.7 or more, 0.75 or more, 0.8 or more, 0.85 or more, 0.9 or more, 0.95 or more, or even 1.0 or more, and at the same time, 2.0 or less, 1.9 or less, 1.8 or less, 1.7 or less, 1.6 or less, 1.5 or less, 1.4 or less, 1.3 or less, 1.2 or less, 1.15 or less, or even 1.1 or less.

The foam formulation of the present invention further comprises a blowing agent comprising water and one or more auxiliary agents such as physical blowing agents. The auxiliary blowing agents may include hydrocarbons, hydrofluorocarbons (HFCs), hydrofluoroolefins (HFOs), hydrochlorofluoroolefins (HCFOs), and mixtures thereof. The hydrocarbon blowing agents may include alkanes including pentane isomers, hexane isomers, and heptane isomers; cycloalkanes; preferably having from 4 to 8 carbon atoms; and mixture thereof. Specific examples of the hydrocarbon blowing agents include n-butane, isobutane, n-pentane, isopentane, 2,3-dimethylbutane, n-hexane, isohexane, n-heptane, isoheptane, cyclopentane, methylcyclopentane, cyclohexane, methylcyclohexane, cycloheptane, and mixtures thereof. Preferred hydrocarbon blowing agents include cyclopentane, n-pentane, isopentane, and mixtures thereof. Particularly desirable HFOs and HCFOs include trans-1-chloro-3,3,3-trifluoropropene (HCFO-1233zd(E)) and (z)-1,1,1,4,4,4-hexafluoro-2-butene (HFO-1336mzz-Z), and mixtures thereof. Examples of suitable hydrofluorocarbon blowing agents include 1,1,1,3,3-pentafluoropropane (HFC-245fa), 1,1,1,3,3-penta-fluorobutane (HFC-365mfc), 1,1,1,2,3,3,3-heptafluoropropane (HFC-227ea), 1,1,1,2-tetrafluoroethane (HFC-134a), and mixtures thereof. Preferably, the auxiliary blowing agent comprises hydrocarbons. In some embodiments, the blowing agent consists of water, cyclopentane and isopentane.

The amount of the blowing agents depends on the desired density of the foam. For example, the amount of water may be in the range of from 0.05% to 2.5%, from 0.1% to 2%, or from 0.2% to 1.5%, based on the total weight of the polyol composition. The auxiliary (physical) blowing agent may be present in an amount of 2% or more, 3% or more, 4% or more, or even 5% or more, and at the same time 30% or less, 20% or less, 15% or less, or even 10% or less, by weight based on the total weight of the polyol composition.

The foam formulation of the present invention further comprises one or more catalysts including, for example, trimerization catalysts, tertiary amine catalysts, organometallic catalysts and mixtures thereof. The trimerization catalysts may be any known to those skilled in the art that will catalyze the trimerization of an organic isocyanate compound to form the isocyanurate moiety. Suitable trimerization catalysts may include, for example, quaternary ammonium salts, 2,4,6-(N,N-dimethylaminomethyl)phenols, hexahydrotriazines, sodium N-2-hydroxy-5-nonylphenyl-methyl-N-methylglycinate, potassium salts of carboxylic acids such as potassium octoate and potassium acetate, and mixtures thereof. Commercially available trimerization catalysts may include those from Evonik Corporation under the trade names, DABCO TMR, DABCO K15 and POLYCAT 46.

The tertiary amine catalyst may be useful as balanced catalysts. The tertiary amine catalysts include any organic compound which contains at least one tertiary nitrogen atom and is capable of catalyzing the hydroxyl/isocyanate reaction. Suitable tertiary amine catalysts may include, for example, triethylenediamine, tetramethylethylenediamine, 1-methyl-4-dimethylaminoethylpiperazine, N,N-dimethylcyclohexylamine, pentamethyldiethylenetriamine, N-methylmorpholine, N-ethylmorpholine, N,N-dimethylethanolamine, 2,4,6-tri(dimethylaminomethyl) phenol, bis(2-dimethylamino-ethyl)ether, N,N',N-ethylmorpholine, and mixtures thereof. Examples of suitable organometallic catalysts include compounds of bismuth, lead, tin, titanium, iron, antimony, uranium, cadmium, cobalt, thorium, aluminum, mercury, zinc, nickel, cerium, molybdenum, vanadium, copper, manganese, zirconium, and combinations thereof. In some embodiments, a mixture of catalysts are used. In further embodiments, a mixture of two trimerization catalysts (such as potassium-based catalysts) with a tertiary amine catalyst is used as the catalyst in the production of polyisocyanurate foams.

The total amount of the catalysts is selected to provide a desired reaction rate. The catalyst may be present in an amount of 0.5% or more, 1% or more, or even 2% or more, and at the same time, 5% or less, 4% or less, or even 3% or less, by weight based on the total weight of the foam formulation.

The foam formulation of the present invention may optionally comprise one or more flame retardants. The flame retardants may include halogenated or non-halogenated flame retardants. Useful flame retardants include brominated types, phosphorus-containing types, antimony oxide, exfoliating graphite, alumina trihydrate, and combinations thereof. Suitable brominated flame retardants may include, for example, a tetrabromophthalate diester/ether diol such as that marketed by Albemarle Corporation as Saytex RB79 or that marketed by Chemtura Corporation as PHT-4-diol, tetrabromobisphenol A, brominated polystyrene, brominated styrene-butadiene polymers, brominated epoxy resins, brominated alkanes such as 1-bromopropane, a brominated polymer such as that marketed by Chemtura as Emerald 3000, or brominated acrylic monomer or polymer thereof; mixtures thereof. Examples of suitable phosphorus-containing flame retardants include various phosphinate, phosphate and phosphonate compounds such as aluminum diethylphosphinate, tris(2-chloropropyl)phosphate, tris(2-chloroethyl)phosphate, tris(1,3-dichloropropyl)phosphate, dimethyl methylphosphonate, diethyl ethylphosphonate, diammonium phosphate triethyl phosphate, poly(m-phenylene methylphosphonate), oligomeric ethyl ethylene phosphate, resorcinol bis(diphenylphosphate) and bisphenol A bis(diphenyl phosphate), and mixtures thereof. The flame retardant may be present in an amount of from 1% to 20%, from 2% to 15%, or from 3% to 10%, by weight based on the total weight of the foam formulation.

In addition to the components described above, the foam formulation of the present invention may further comprise any one or combination of other additives: colorants, dyes, additional surfactants, fillers and pigments such as titanium dioxide, calcium carbonate, iron oxide, microspheres, alumina trihydrate, wollastonite, prepared glass fibers (dropped or continuous), polyester fibers and other polymeric fibers, and combinations thereof. These additives may be present in a combined amount of from zero to 30% by weight based on the weight of the foam formulation.

The rigid polyurethane foam of the present invention is prepared from the foam formulation described above. In general, the polyurethane foam may be prepared by bringing the various components of the foam formulation together under conditions such that the polyol(s) and isocyanate(s) react while the blowing agent causes the foam formulation to expand. Such polyurethane foam is typically prepared by intimately mixing the reaction components, i.e., a polyisocyanate component comprising the polyisocyanate (also known as "A-component"), along with an isocyanate-reactive component (also known as "B-component") typically comprising the polyester polyol, the silicone organic surfactant, and the blowing agent defined hereinabove, and optionally the flame retardant. Additional component (also known as "C-component" may be included, as desired, for the introduction of various catalysts and other optional additives. The nucleating agent can be added to the polyisocyanate component. These components may be mixed together in any convenient manner, for example by using any of the mixing equipment described in the prior art for the purpose, such as a mix head with or without a static mixer, or a vessel, and then depositing the reacting mixture onto a substrate. The rigid polyurethane foam may also be produced in the form of slabstock, a molding, including for example, a pipe or insulated wall or hull structure, a sprayed foam, a frothed foam, or a laminate or laminated product formed with other materials such as hardboard, plasterboard, plastics, paper, metal, or a combination thereof. In general, the polyurethane foams may be produced by discontinuous or continuous processes, including the process referred to generally as the discontinuous panel process (DCP) and continuous double belt lamination (DBL), with the foaming reaction and subsequent curing being carried out in molds or on conveyors.

The resultant rigid polyurethane foam of the present invention may have a density of 20 kg/m$^3$ or more, 22 kg/m$^3$ or more, 25 kg/m$^3$ or more 26 kg/m$^3$ or more, 29 kg/m$^3$ or more, 30 kg/m$^3$ or more, or even 31 kg/m$^3$ or more, and at the same time, 50 kg/m$^3$ or less, 48 kg/m$^3$ or less, 45 kg/m$^3$ or less, 43 kg/m$^3$ or less, 41 kg/m$^3$ or less, 40 kg/m$^3$ or less, 38 kg/m$^3$ or less, or even 35 kg/m$^3$ or less, as measured according to the test method described in the Examples section below. The rigid polyurethane foam may have an open cell content less than 30%, less than 25%, less than 20%, less than 15%, or even less than 10%, as measured according to the ASTM D6226-15 standard.

The rigid polyurethane foam of the present invention may have improved thermal conductivity, as indicated by at least 0.3 mW/m·K drop for k-factor at 10° C., as compared to foams made from the same foam formulation except in the absence of the cyclic siloxane described above. For example, the rigid polyurethane foam may show k-factor at 10° C. of from 15 to 25 mW/m·K, for example, 22.5 mW/m·K or less, 22.0 mW/m·K or less, 21.5 mW/m·K or less, 21.0 mW/m·K or less, 20.5 mW/m·K or less, or even 20.0 mW/m·K or less, as measured in accordance with the EN13165 standard.

The rigid polyurethane foam of the present invention is particularly useful for thermal insulating applications such as in coolers, freezers, refrigerators, roofs, walls and decking. The foam formulation may also be used in free-rise applications.

Examples

Some embodiments of the invention will now be described in the following Examples, wherein all parts and percentages are by weight unless otherwise specified.

Phthalic anhydride-derived polyester polyol 1 is Stepanpol PS 2352 polyol available from Stepan, having a hydroxyl number of 235 mg KOH/g and a functionality of 2.

Phthalic anhydride-derived polyester polyol 2 is Stepanpol PS 3152 polyol available from Stepan, having a hydroxyl number of 315 mg KOH/g and a functionality of 2.

Terephthalic acid-derived polyester polyol 2, available from The Dow Chemical Company, is a polyester polyol based on terephtalic acid, having a hydroxyl number of 315 mg KOH/g and a functionality of 2.4.

Terephthalic acid-derived polyester polyol 1, available from The Dow Chemical Company, is a polyester polyol based on terephtalic acid, having a hydroxyl number of 212 mg KOH/g and a functionality of 2.

DABCO K 15 Catalyst, available from Evonik, is potassium 2-ethyl hexanoate in diethylene glycol.

POLYCAT™ 5 Catalyst, available from Evonik, is pentamethyldiethylenetriamine (PMDETA).

DABCO K 2097 Catalyst, available from Evonik, is potassium acetate, in diethylene glycol.

Tris(2-chloroisopropyl)-phosphate (TCPP), available from ICL, is used as a flame retardant.

Triethylphosphate (TEP), available from ICL, is used as a flame retardant.

Surfactant 1 is TEGOSTAB B 8421 available from Evonik, a non-hydrolysable polyether-polydimethyl-siloxane-copolymer.

Surfactant 2 is NIAX L-6633 silicone copolymer available from Momentive Performance Materials.

Surfactant 3 is VORASURF™ SF 2938 Silicone surfactant available from The Dow Chemical Company.

CP/IP (70/30) is a mixture of cyclo-pentane (CP) and iso-pentane (IP) (70/30 by weight) used as a blowing agent.

XIAMETER™ PMX-0245 Cyclopentasiloxane, available from The Dow Chemical Company, is decamethylcyclopentasiloxane (D5) with a surface tension at 25° C. of 18 dynes/cm.

XIAMETER™ PMX-200 SILICONE FLUID 1 CS, available from The Dow Chemical Company, is octamethyltrisiloxane (L3) with a surface tension at 25° C. of 17.4 dynes/cm.

XIAMETER™ PMX-200 SILICONE FLUID 0.65 CS, available from The Dow Chemical Company, is hexamethyldisiloxane (L2) with a surface tension at 25° C. of 15.9 dynes/cm.

VORANATE™ M 600 Isocyanate, available from The Dow Chemical Company, is a polymeric methylene diphenyl diisocyanate (PMDI) having an average molecular weight of 302 grams per mole, a functionality of 2.3, an isocyanate equivalent weight of approximately 131.4 g/eq, —NCO content of 31.36-32.57% by weight.

XIAMETER and VORANATE are trademarks of The Dow Chemical Company.

The following standard analytical equipment and methods are used in the Examples.

Foaming Procedure

All foam samples were prepared using high-pressure injection machines model Afros-Cannon A-40 equipped with a L-shaped self-cleaning mixing head (FPL14 head, output speed: 200 g/s). Each Formulated polyol was obtained by pre-mixing all the polyols, the catalysts, the flame retardants, the silicone surfactants, the siloxanes if used and blowing agent, as listed in Table 1. Formulated polyol was pre-mixed and kept at 20±2° C. Isocyanate was kept at 20±2° C. Formulated polyols and isocyanate were then processed with a mixing pressure equal to 150±20 bar (15000±2000 kPa).

Reactivity and free rise density samples were obtained by foaming the resultant foam formulations in a 20 cm by 20 cm by 20 cm wooden box.

Samples for mechanical and thermal properties were cut from molded foams obtained by pouring the resultant foam formulation in a 70×50×10 cm aluminum mold and kept at 50° C.

Reactivity

Cream time, gel time and tack free time in seconds (s) were recorded during the foam rise. Cream time is the time when the foam starts rising; at this point the liquid becomes clearer due to bubble formation. Gel time is the point at which the foam mixture has developed enough internal strength to be dimensionally stable: it sticks to the metal stick to form strings when withdrawn. Tack free time is the point at which the skin of the foam does not stick anymore to a glove covered finger when the foam is touched gently.

Free Rise Density (FRD)

A free rise box foam was prepared as above and then cut after 30 minutes to measure the density. Volume of a foam specimen was determined by multiplying the three dimensions of the foam specimen cut from the core of the foam. Density was determined by dividing mass of the foam specimen by the aforementioned volume.

Thermal Conductivity

Thermal conductivity measurements were carried out with LaserComp Fox 200 equipment at an average temperature of 10.0° C. according to UNI EN 13165:2016 standard, and reported as k-factor. Specimen were cut from 70×50×10 cm molded samples.

Open Cell Content

The open cell content measurements were carried out according to the UNI EN ISO 4590:2016. Specimen were cut from 70×50×10 cm molded samples.

Compressive Strength

The compressive strength was measured at room temperature according to UNI EN 826:2013. Specimen were cut from 70×50×10 cm molded samples.

Samples I, II and III

Three groups of molded foam samples, Samples I, II and III, were prepared using high pressure injection machines and dispensing equipment from Afros-Cannon in accordance with the foaming procedure described above, based on formulations given in Table 1. Linear and cyclic siloxanes (L2, L3, and D5) were tested as additives for impacts on thermal conductivity properties of polyisocyanurate (PIR) foams. The isocyanate index was varied from 2.5 to 4.1. The foam formulation samples were evaluated for reactivity, density, thermal conductivity, open cell content, compression strength, according to the test methods described above. Results of these properties are given in Table 1.

Regarding Samples I, as shown in Table 1, the foam formulation of Ex 1 comprising D5 cyclic siloxane in combination of a silicone surfactant at a specific additive/SS ratio provided foams with better thermal conductivity as indicated by more than 0.3 mW/m·K drop for k-factor, as compared to the formulation free of any siloxane (Comp Ex A). In contrast, the use of D5 at an Additive/SS ratio of 2.27 (Comp Ex A2) or linear siloxane (L3, Comp Ex A1) didn't show improvement on thermal conductivity properties. The foam formulation of Ex 1 showed no significant drop in compressive strength.

Regarding Samples II, the foam formulations of Ex 2 and Ex 2-1 both provided foams with improved thermal conductively and compressive strength as compared to that of Comp Ex B. In contrast, foam formulations comprising linear siloxane (L2, Comp Ex B 1), or D5 at an Additive/SS ratio of 0.57 (Comp Ex B32) failed to provide improvements on thermal conductivity properties of foams.

Regarding Samples III, the foam formulation of Ex 3 provided foams with improved thermal conductivity and compressive strength as compared to that of Comp Ex C free of siloxanes.

TABLE 1

Foam Formulations and Foam Properties

| | Samples I | | | | Samples II | | | | | Samples III | |
|---|---|---|---|---|---|---|---|---|---|---|---|
| Components[1] | Comp Ex A | Comp Ex A1 | Ex 1 | Comp Ex A2 | Comp Ex B | Comp Ex B1 | Ex 2 | Comp Ex B2 | Ex 2-1 | Comp Ex C | Ex 3 |
| Phthalic anhydride-derived polyester polyol 1 | 48.5 | 48.5 | 48.5 | 48.5 | 48.5 | 48.5 | 48.5 | 48.5 | 48.5 | 42.5 | 42.5 |
| Phthalic anhydride-derived polyester polyol 2 | 48.5 | 48.5 | 48.5 | 48.5 | 48.5 | 48.5 | 48.5 | 48.5 | 48.5 | | |
| Terephtalic acid-derived polyester polyol 1 | | | | | | | | | | 31.9 | 31.9 |
| Terephtalic acid-derived polyester polyol 2 | | | | | | | | | | 10.7 | 10.7 |
| TCPP | 8.6 | 8.6 | 8.6 | 8.6 | 8.6 | 8.6 | 8.6 | 8.6 | 8.6 | | |
| TEP | | | | | | | | | | 15.0 | 15.0 |
| Surfactant 1 | | | | | | | | | | 4.0 | 4.0 |
| Surfactant 2 | 2.2 | 2.2 | 2.2 | 2.2 | 2.2 | 2.2 | 2.2 | 2.2 | | | |
| Surfactant 3 | | | | | | | | | 2.2 | | |
| DABCO 2097 | 0.50 | 0.50 | 0.50 | 0.50 | 0.50 | 0.50 | 0.50 | 0.50 | 0.50 | 1.50 | 1.50 |
| Polycat 5 | 0.3 | 0.3 | 0.3 | 0.3 | 0.3 | 0.3 | 0.3 | 0.3 | 0.3 | 1.0 | 1.0 |
| $H_2O$ | 0.5 | 0.5 | 0.5 | 0.5 | 0.5 | 0.5 | 0.5 | 0.5 | 0.5 | 0.8 | 0.8 |
| DABCO K15 | 3.7 | 3.7 | 3.7 | 3.7 | 3.7 | 3.7 | 3.7 | 3.7 | 3.7 | | |
| CP/IP | 15.0 | 15.0 | 15.0 | 15.0 | 15.0 | 15.0 | 15.0 | 15.0 | 15.0 | 20.0 | 20.0 |
| Additive L2 | | | | | | 1.1 | | | | | |
| L3 | | 2.50 | | | | | | | | | |
| D5 | | | 2.50 | 5 | | | 2.50 | 1.25 | 2.50 | 0.00 | 4.00 |
| VORANATE M600 | 193.4 | 193.4 | 193.4 | 193.4 | 193.4 | 193.4 | 193.4 | 193.4 | 195.4 | 264 | 264 |
| Isocyanate Index | 250 | 250 | 250 | 250 | 250 | 250 | 250 | 250 | 250 | 410 | 410 |
| Additive/SS[2] | 0 | 1.14 | 1.14 | 2.27 | 0 | 0.5 | 1.14 | 0.57 | 1.14 | 0 | 1 |
| Properties | | | | | | | | | | | |
| Cream time, s | 5 | 5 | 5 | 5 | 7 | 8 | 7 | 7 | 8 | 5 | 5 |
| Gel time, s | 16 | 17 | 15 | 16 | 18 | 20 | 20 | 21 | 20 | 27 | 26 |
| Tack free time, s | 20 | 20 | 17 | 21 | 23 | 25 | 25 | 25 | 25 | 88 | 49 |
| k-factor @ 10° C., mW/m · K | 19.69 | 19.63 | 18.95 | 19.38 | 20.66 | 22.39 | 20.04 | 20.46 | 19.62 | 21.99 | 20.9 |

TABLE 1-continued

Foam Formulations and Foam Properties

| | Samples I | | | | Samples II | | | | | Samples III | |
|---|---|---|---|---|---|---|---|---|---|---|---|
| Components[1] | Comp Ex A | Comp Ex A1 | Ex 1 | Comp Ex A2 | Comp Ex B | Comp Ex B1 | Ex 2 | Comp Ex B2 | Ex 2-1 | Comp Ex C | Ex 3 |
| Open cell, % vol | 7.7 | 9.6 | 12.3 | 15.4 | 15.5 | 15.5 | 18.2 | 12.2 | 9 | 7.4 | 6.5 |
| Free rise density, kg/m$^3$ | 30.8 | 34 | 31.0 | 31.3 | 30.8 | 31.0 | 31.9 | 31.7 | 33 | 40.3 | 40.4 |
| Compressive strength, kPa | 182 | 159 | 113 | 126 | 246 | 220 | 268 | 243 | 309 | 248 | 256 |

[1]All components in parts by weight,
[2]Addidtive/SS refers to the weight ratio of an additive (e.g., L2, L3 or D5) to a silicone surfactant (e.g., surfactant 1, surfactant 2, surfactant 3, or combinations thereof).

What is claimed is:

1. A rigid polyurethane foam formulation comprising:
   a polyol composition comprising, by weight based on the weight of the polyol composition, from 30% to 70% of a first polyester polyol having a hydroxyl number of from 200 to 250 mg KOH/g, and from 70% to 30% of a second polyester polyol having a hydroxyl number of from 280 to 320 mg KOH/g;
   a blowing agent comprising water and an auxiliary blowing agent;
   a silicone copolymer surfactant;
   from 1% to 5% by weight based on the weight of the polyol composition, of a cyclic siloxane having a surface tension less than 21 dynes/cm at 25° C., wherein the weight ratio of the cyclic siloxane to the silicone copolymer surfactant is from 0.6 to less than 2.27;
   a catalyst, and optionally a flame retardant; and
   a polyisocyanate;
   wherein the isocyanate index is in the range of from 180 to 500.

2. The foam formulation of claim 1, wherein the silicone copolymer surfactant comprises a polyether-polysiloxane copolymer.

3. The foam formulation of claim 1, wherein the cyclic siloxane is selected from the group consisting of hexamethylcyclotrisiloxane, octamethylcyclotetrasiloxane, decamethylcyclopentasiloxane, and dodecamethylcyclohexasiloxane.

4. The foam formulation of claim 1, wherein the weight ratio of the cyclic siloxane to the silicone copolymer surfactant is in the range of from 0.6 to 1.5.

5. The foam formulation of claim 1, comprising from 0.5% to 1.5% by weight of the silicone copolymer surfactant, based on the weight of the total weight of the foam formulation.

6. The foam formulation of claim 1, wherein the auxiliary blowing agent is selected from the group consisting of pentane isomers, 2,2-dimethylbutane, hydrofluorocarbons and hydrofluoroolefins, hydrochlorofluoroolefins, or mixtures thereof.

7. A rigid polyurethane foam comprising the reaction product of the foam formulation of claim 1.

8. The rigid polyurethane foam of claim 7 having a density of from 20 to 50 kg/m3.

* * * * *